May 2, 1961 N. K. LINDGREN 2,982,554

ARRANGEMENT IN TONE ARMS FOR GRAMOPHONES

Filed Oct. 7, 1958

INVENTOR

*NILS KAURI LINDGREN*

BY [signature]

AGENT

United States Patent Office 2,982,554

Patented May 2, 1961

2,982,554

ARRANGEMENT IN TONE ARMS FOR GRAMOPHONES

Nils Kauri Lindgren, Stockholm, Sweden, assignor to North American Philips Company, Inc., New York, N.Y., a corporation of Delaware Filed Oct. 7, 1958, Ser. No. 765,759

6 Claims. (Cl. 274—15)

Figure 1:
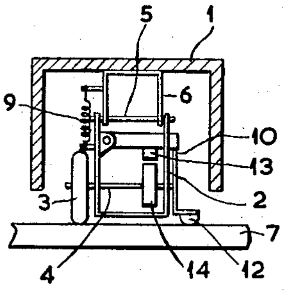

The present invention relates to an arrangement in a phonograph tone arm having a supporting member, which is arranged for vertical and horizontal movement from and towards respectively the plane of the turntable and which comprises a supporting roller, which in its lowered, operative position supports the tone arm, during an outwards swinging movement, against an underlying record at such a distance from the record, that the needle point is elevated above the same, while the needle point is brought to engage the record when it reaches the record edge by the supporting member then being shifted to its elevated, inoperative position.

Phonograph tone arms provided with an arrangement of the above-mentioned types are well known. They are frequently used in automatic record players and record changers, by which it is possible to play records of different sizes with an automatic adjustment of the tone arm for engaging the entrance groove of the record. Before the playing of a record the phonograph works are then usually arranged first to shift automatically the supporting member with the supporting roller into its lowered, operating position and thereafter to put the needle microphone down onto the rotating record within the periphery of the least record size to be played. The phonograph tone arm is then disengaged from the driving mechanism, and the roller serving as a supporting member is so obliquely adjusted in relation to the direction of motion of the underlying phonograph record that the tone arm is moved outwardly by the rotation of the record until it reaches the edge of the record, where thus the supporting member will be elevated and the point of the needle microphone will engage with the entrance groove of the record.

In all arrangements of this kind hitherto known, it is a condition for the supporting member to be elevated that the supporting roller passes beyond the edge of the record, for instance due to the pressure of the needle microphone being instead taken over by a special auxiliary member for shifting the supporting member, or by the roller being subject to an axial displacement by its engagement with the edge of the record and the occurrence of an inwardly directed force exerted on the tone arm caused by the engagement of the needle point or of some other auxiliary member with the record, which axial displacement is utilized for shifting the supporting member into its inoperative position.

The present invention has as its object to provide an arrangement, in which the passing of the supporting roller beyond the edge of the record is not a condition for the supporting member to be elevated, but in which the supporting member still supports the tone arms against the underlying record even at the moment when the shift takes place. This may be of special value with respect to the fact that it often may happen that the supporting roller, when passing over the edge of the record, obtains an impulse from the latter in such a direction that the tone arm swings outwards and the needle point lands outside the edge of the record instead of engaging its entrance groove. The present invention may be applied for overcoming functional problems of the above-mentioned kind. In general, however, the value of the invention lies in the fact that it implies a completely new principle of shifting the supporting member at the finding of the record edge, which principle creates new possibilities for developing arrangements of the kind concerned as will be evident from the following description.

The invention is characterized mainly by the fact that a special feeler member is provided, which during the outward swinging movement of the tone arm also rests on the underlying phonograph record though outside the supporting roller as seen from the center of the turntable, which feeler member is movable in relation to the supporting surface of the supporting roller on the record under the influence of a directional force (spring force, gravitation) so that it is shifted on passing the edge of the record and thereby causes the supporting member to take its inoperative, elevated position.

Furthermore the feeler member and the supporting member are mechanically interconnected in such a manner that on the shifting of the supporting member into its inoperative position the feeler member becomes elevated so that it will lie entirely above the needle point after the shift.

In a preferred embodiment of the invention the feeler member is arranged to cause on its movement into a position beneath the supporting plane of the supporting roller a braking of the latter the shaft of the roller (possibly together with its holder), being movable against a counteracting force in the rotation direction of the record as a result of the force actuation exerted on the shaft of the supporting roller in said direction due to the braking of the supporting roller and its frictional engagement with the record which movement of the shaft of the supporting roller (or its holder) causes the shifting of the supporting member into its elevated, non-operative position.

Figure 2:
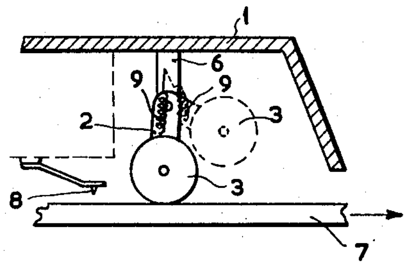
Figure 3:
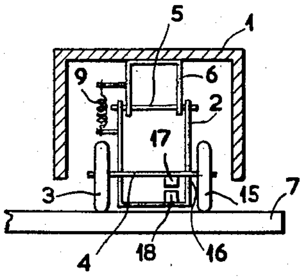

The invention will be explained more closely with reference to the annexed drawing, in which Figures 1 and 2 schematically show an arrangement according to the invention as seen in the longitudinal direction of the tone arm and in its transverse direction respectively, and Fig. 3 shows a modified embodiment of an arrangement according to the invention as seen in the longitudinal direction of the tone arm.

In Fig. 1, the reference numeral 1 designates the tone arm head shown in cross section. The supporting member consists of a U-shaped frame 2 with a supporting roller 3 mounted on a shaft 4 having its bearings in the frame 2. The latter is swingably mounted by means of a pin 5 in another frame 6, which is fixed to the tone arm head. The pin 5 extends transversely to the longitudinal direction of the tone arm and accordingly the frame 2 is swingable in the direction of motion of the underlying record 7. It is then movable between two limit or end positions, namely one, in which the frames 2 and 6 are approximately in alignment, and another one, in which the frame 2 is upturned and forms an angle with the frame 6. The firstmentioned position of the frame 2 is shown in Fig. 1. In Fig. 2, where the arrangement is viewed from the side and where the details are designated with the same numerals as in Fig. 1 the supporting member is shown in this position with continuous lines, and the other end position is indicated with dotted lines. In the firstmentioned position, which represents the operative position of the supporting member, the supporting roller 3 is lowered so that the needle 8 of the microphone (Fig. 2) is kept elevated above the record by the tone arm being supported by the supporting roller 3. The latter is so arranged in a manner known per se, that it by coaction with the rotating phonograph record conducts the tone arm outwardly towards the edge of the record, which thus may take place without any hindrance from the needle 8. In the other end position representing the inoperative position of the supporting member, the supporting roller 3 is elevated sufficiently high to enable the needle to engage with the groove of the record without the tone arm being hindered at its inward movement during the playing of the record. The two end positions of the frame 2 are determined by suitable stops e.g. in the form of projecting lugs on one or both of the frames 2 and 6. For simplicity's sake these stops have been omitted in the drawing. A retractible screw spring 9 is provided between spring holds on the frames 2 and 6, so that the spring holds the pin 5 form in the lowered position of the frame 2 (the operative position of the supporting member) approximately a straight line, preferably so that the pin 5 lies a little behind the connecting line between the spring holds as seen in he direction of motion of the phonograph record as indicated by an arrow in Fig. 2. The spring imparts thus a certain, though little torque to the frame 2 in its lowered position which torque counteracts its shifting. During the movement of the yoke 2 towards its elevated position this torque passes through zero and thereafter grows quickly, so that the spring 9 turns up the frame 2 high enough to bring the supporting roller 3 above the point of the needle 8. The supporting member consisting of the frame 2 with the supporting roller 3 has thus two stable end positions and when passing from its operative to its inoperative end position it passes through an unstable intermediate position. The principle of such a sudden shift from one position to the other of two swingably jointed parts in relation to each other is well known per se, for example in electrical quick break toggle switches.

An L-shaped feeler member 10 is at 11 pivotally mounted in the yoke 2 and is at its free end provided with a slide member 12, with the purpose to rest against the underlying phonograph record. The feeler member 10 is swingable in a plane normal to the plane of the turntable, and the slide member 12 is pressed against the underlying phonograph record by the weight of the feeler member. Possibly a retractible screw spring may be inserted between the horizontal part of the feeler member 10 and the frame 2, or a spring load on the feeler member may be obtained in some other way, if the actuation caused by the gravity alone proves to be insufficient. However, the spring tension must then be so chosen that the main part of the load from the tone arm is taken up by the supporting roller 3. The slide member 12 should consist of a material e.g. a synthetic resin, having a great mechanical resistance and a small friction on the phonograph record. Possibly the slide member 12 may be replaced by an auxiliary roller rotatably mounted substantially parallel with the supporting roller 3. An essential feature of the invention is that the feeler member 10 is so situated in relation to the supporting roller 3, that it bears against the underlying phonograph record outside the bearing surface of the supporting member, i.e. of the supporting roller 3, as seen from the center of the phonograph record.

On the feeling member 10 there is a brake shoe 13, which is adapted to coact with a roller 14 serving as a brake drum, which is secured to the shaft 4. As already mentioned, the supporting roller 3 is also fixedly mounted on this shaft, whereby a braking of the brake roller 14 also results in a braking of the supporting roller 3.

The arrangement operates in the following manner. When the tone arm head is lowered onto the rotating phonograph record, the supporting member is in its operative position, i.e. the frame 2 is turned down with the supporting roller 3 lowered as shown in Fig. 1 and as illustrated in with continuous lines in Fig. 2. The tone arm is released from the driving works and by the action of the supporting roller 3 rolling on the rotating phonograph record it is carried towards the periphery of the record. During this movement the feeler member 10 is kept elevated by the slide member 12 bearing against the phonograph record, so that the brake shoe 13 is kept elevated above the brake drum 14, and accordingly the shaft 4 with the attached supporting roller 3 can freely rotate. The torque imparted to the frame 2 by the phonograph record is then negligible and does in any case not overcome the previously mentioned counteracting initial torque caused by the retractible spring 9. The supporting member remains therefore in its lowered, operative position during the outward movement. As soon as the slide member 12 passes over the edge of the record, however, the feeler member 10 swings downwards, whereby the brake shoe 13 is brought to engage with the brake roller 14. The supporting roller 3 is thereby braked and by frictional engagement of this roller with the phonograph record the frame 2 obtains a relatively great torque in the direction of motion of the record. Hereby the previously mentioned initial torque is overcome, so that the supporting member is pulled up by the spring 9 into its elevated inoperative position. As the supporting roller 3 is carried into the tone arm head, the latter is lowered, so that the point of the needle 8 is brought to engage the phonograph record. By the supporting roller 3 thus not passing beyond the edge of the record as the case in hitherto known devices of the corresponding kind, but instead being braked already while still bearing on the record, it can be secured that the tone arm is not unintentionally carried so far outwards that the needle 8 lands outside the edge of the record. A fact which may be important in this connection is that the supporting roller 3—which as shown is situated near the needle 8—on the braking causes a frictional force component, which is directed in the lateral direction of the tone arm towards the center of the record. Such a force component arises provided that the connecting line between the turning center of the tone arm and the frictional surface of the supporting roller on the phonograph record forms an acute angle to the connecting line between the said frictional surface and the rotation center of the record. This condition is usually fulfilled in conventional tone arm constructions as to the frictional forces acting on the needle, and by placing the supporting roller near to the needle, this effect can thus be obtained without special constructive measures being necessary. This inwardly directed force component then acts as an effective brake against every tendency of the tone arm to continue its outward swinging movement by its own inertia. Besides the arrangement may be carried out in such a way, that the said force component manages to carry the tone arm inwards a small distance while the shifting of the supporting member takes place, whereby additional security is obtained for the needle point not to be brought too far outwards but is put down onto the space of a few millimeters in width usually provided along the periphery of the record, which space has no sound grooves but usually instead an entrance groove.

Since the feeler member 10 is mounted in the frame 2, it is also retracted when the frame 2 with the supporting roller 3 is elevated into the tone arm head.

In the above described embodiment the braking of the supporting roller 3 will be relatively soft, due to a frictional braking by means of the brake shoe 13 and the associated brake roller 14. The braking may be made considerably more distinct, if the brake roller 14 is provided with one or more notches and the brake shoe 13 is replaced by a lug or the like, which engages such a notch when the feeler member 10 falls down and thus immediately stops the supporting roller 3.

In the modified embodiment shown in Fig. 3 the same details which are to be found in the embodiment according to Figs. 1 and 2 have the same numeral designations. The supporting member as such comprising the movable frame 2 with the supporting roller 3 is thus susbtantially unchanged as well as the arrangement of the retractible spring 9 for shifting the supporting member on the braking of the supporting roller 3. In this embodiment, however, the feeler member consists of an auxiliary roller 15, which is mounted on the shaft 4 of the supporting roller 3, and does not include any separate arm with an associated slide member or the like as in the previously described embodiment. While the supporting roller 3 is fixedly attached to this shaft, the auxiliary roller 15 is suitably freely rotating on it. In the frame 2 there is provided for the part of the shaft or axle 4 lying nearest to the auxiliary roller 15 an oblong hole 16, which is so shaped that the load from the tone arm is entirely taken up by the bearing of the shaft 4 which lies adjacent to the supporting roller 3. The shaft 4 will in this way be swingable in the vertical plane with said bearing as a fulcrum. A projection 17, e.g. in the form of a lug, is attached to the shaft 4, which projection is situated above a corresponding projection 18 protruding from the frame 2. The projection 17 passes freely past the projection 18 as long as the shaft 4 is in its horizontal position i.e. as long as both rollers 3 and 15 bear against the underlying phonograph record. As the load from the tone arm is taken up by that bearing of the shaft 4, which lies nearest to the supporting roller 3, the main part of the load will be borne by the supporting roller 3, while the auxiliary roller 15 is pressed against the phonograph record only with a relatively low pressure.

When, during the outward swinging movement of the tone arm, the auxiliary roller 15 working as feeler member passes beyond the edge of the record, it is lowered outside the edge and the shaft 4 swings downwards in the oblong hole 16. The projection 17 on the shaft then engages the projection 18 on the frame 2, whereby the supporting roller 3 is stopped and the supporting member is shifted in the manner described above.

The invention may of course be varied and modified in many different ways within the scope of the broad inventive idea. Thus for instance retractable spring 9 needs not necessarily cause an initial torque counteracting the shift of the supporting member when in operative position, but the desired toggle effect may be obtained in other ways known per se. Although a combination of an arrangement working by snap effect substantially according to the described examples with a braking of the supporting roller caused by the feeler member is a preferred embodiment, it is possible within the scope of the invention to use instead a supporting member comprising a cradle, in which the supporting roller is journalled and which is kept in its lowered, operative position by a locking member against the action of a spring force, which locking member is removed by the feeler member and thus causes the shifting of the supporting member.

The restoring of the supporting member from its inoperative to its operative position may take place in many different ways, and as the invention is not concerned with the arrangement necessary therefore, no such arrangement has been described or shown on the drawing. It may, however, be mentioned that this restoring may simply be effected in the described embodiments by means of an operating lever slidably guided in the longitudinal direction of the tone arm, for instance consisting of a metal wire, which on a displacement may engage the frame 2 for restoring the supporting member and which either may be operated through the tone arm from the record player, or may be provided with a projecting operating lug, which, during the outward swinging movement of the tone arm after the playing of a record, is carried along a leader stationarily mounted on the body of the phonograph and acting as an operating curve.

What is claimed is:

1. A phonograph turntable tone arm comprising a supporting member having a shaft and adapted to be movable towards and away from said turntable, a supporting roller, means rotatably mounting said supporting roller on the shaft of said supporting member, said supporting roller in its lowered position being in engagement with the record to be played and supporting said tone tone arm at a predetermined distance from said record whereby the phonograph needle is maintained out of engagement with said record, and a feeler element secured to said supporting member, said feeler element and supporting roller being mechanically interconnected and movable along said record to be played, said feeler element being additionally movable in another direction whereby a certain position is reached, means exerting a force on the shaft of said supporting roller when said certain position is reached which causes the pivotal movement of said supporting roller to an elevated, inoperative position.

2. A phonograph turntable tone arm comprising a supporting member adapted to be movable towards and away from said turntable, a rotatable support roller, means pivotally mounting said supporting member about an axis which is substantially transverse to the longitudinal axis of said tone arm, said supporting roller being mounted on said supporting member whereby said roller in one position is located below the level of said phonograph needle and in another position is located above the level of said photograph needle, said supporting roller in its lowered position being in engagement with the record to be played and supporting said tone arm at a predetermined distance from said record whereby the phonograph needle is maintained out of engagement with said record, and means secured to said supporting member which when the outer peripheral edge of the record is engaged thereby said supporting member and roller is elevated to its inoperative position and simultaneously the phonograph needle is lowered into engagement with the record to be played, the force exerted on said roller in the direction of rotation of said record being insufficint for shifting the roller from its lowered position to its elevated position, said means including means for braking said roller whereby the force exerted on said roller becomes sufficient to shift said roller from its lowered position to its elevated position.

3. A phonograph turntable tone arm as claimed in claim 2 further comprising a spring connected between the tone arm and said supporting member, said spring applying a counteracting force to said supporting member which resists the shifting of the roller to its inoperative elevated position and causes said roller to react in the manner of a toggle.

4. A phonograph turntable tone arm as claimed in claim 1 wherein said feeler element includes a lever pivotably mounted in said supporting member and having at its free end a bearing portion for engaging the top surface of a phonograph record, braking means for said supporting member on said tone arm, said supporting member and roller being raised to an elevated position upon the passing of the outer peripheral edge of the record by said feeler element through the assistance of and said braking means.

5. A phonograph turntable tone arm comprising a supporting member adapted to be movable towards and away from said turntable, a supporting roller, means rotatably mounting said supporting roller on said supporting member, said supporting roller in its lowered position being in engagement with the record to be played and supporting said tone arm at a predetermined distance from said record whereby the phonograph needle is maintained out of engagement with said record, and a feeler element secured to said supporting member, said feeler element and supporting roller being mechanically interconnected, said feeler element including an auxiliary roller which when the outer peripheral edge of the record is engaged thereby is elevated to an inoperative position together with said supporting roller, and braking means on said tone arm for causing braking and assisting in the elevation of said roller upon movement of said supporting member due to said auxiliary roller engaging the outer peripheral edge of the record.

6. A phonograph turntable tone arm comprising a supporting member adapted to be movable towards and away from said turntable, a supporting roller, a feeler element including an auxiliary roller secured to said supporting member, a common shaft in said supporting member mounting said supporting roller and auxiliary roller, means rotatably mounting said supporting roller on said supporting member, said supporting roller in its lowered position being in engagement with the record to be played and supporting said tone arm at a predetermined distance from said record whereby the phonograph needle is maintained out of engagement with said record, means mechanically interconnecting said feeler element and said supporting roller, said feeler member including said auxiliary roller which when the outer peripheral edge of said record is engaged thereby is elevated to an inoperative position together with said supporting roller, and braking means for causing braking and assisting in the elevation of said roller upon movement of said supporting member due to said auxiliary roller engaging the outer peripheral edge of said record, said braking means including a part thereof mounted on said common shaft, and a part fixed to said supporting member, said parts being separated when both said supporting roller and auxiliary roller engage said record, and said parts interengaging when said auxiliary roller engages the peripheral edge of said record.

References Cited in the file of this patent

FOREIGN PATENTS 775,956 Great Britain ---------- May 29, 1957